US012360695B2

United States Patent
Nagao et al.

(10) Patent No.: US 12,360,695 B2
(45) Date of Patent: Jul. 15, 2025

(54) STORAGE DEVICE

(71) Applicant: Hitachi, Ltd., Tokyo (JP)

(72) Inventors: Takashi Nagao, Tokyo (JP); Tomohiro Yoshihara, Tokyo (JP); Jun Miyashita, Tokyo (JP); Masahiro Tsuruya, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/602,472

(22) Filed: Mar. 12, 2024

(65) Prior Publication Data

US 2025/0044968 A1 Feb. 6, 2025

(30) Foreign Application Priority Data

Aug. 3, 2023 (JP) ................................. 2023-127066

(51) Int. Cl.
*G06F 3/00* (2006.01)
*G06F 3/06* (2006.01)

(52) U.S. Cl.
CPC ............ *G06F 3/064* (2013.01); *G06F 3/0608* (2013.01); *G06F 3/0673* (2013.01)

(58) Field of Classification Search
None
See application file for complete search history.

(56) References Cited

U.S. PATENT DOCUMENTS

2022/0121402 A1 4/2022 Nagao et al.
2024/0069810 A1* 2/2024 Shin ........................ G06F 12/04

FOREIGN PATENT DOCUMENTS

EP           3812904 A1 *  4/2021  ........... G06F 3/0604
WO   WO-2021177394 A1 *  9/2021  ........... G06F 3/0608

* cited by examiner

*Primary Examiner* — Midys Rojas
(74) *Attorney, Agent, or Firm* — MATTINGLY & MALUR, PC

(57) ABSTRACT

A storage device includes a processor and an accelerator configured to compress and decompress data. The processor receives first replacement write data for a part of a first logical address region to update first data in the first logical address region that has been compressed by basic compression unit. The processor instructs the accelerator to compress the first replacement write data by a size smaller than the basic compression unit. The accelerator compresses the first replacement write data by the smaller size. The processor merges not-to-be-replaced data in the first logical address region and the first replacement data that are decompressed by the accelerator to generate uncompressed data having a size of the basic compression unit. The processor instructs the accelerator to compress the uncompressed data by the basic compression unit.

10 Claims, 10 Drawing Sheets

| LOGICAL ADDRESS 11 | PHYSICAL ADDRESS 12 | COMPRESSED DATA SIZE 13 | LOGICAL ADDRESS OFFSET 14 | OFFSET-BASED PHYSICAL ADDRESS 15 | OFFSET-BASED COMPRESSED DATA SIZE 16 |
|---|---|---|---|---|---|
| 0xa000 | 0x3000 | 15 | 0 | NULL | NULL |
| | | | 1 | NULL | NULL |
| | | | 2 | NULL | NULL |
| | | | 3 | NULL | NULL |
| 0xB000 | 0x2000 | 18 | 0 | NULL | NULL |
| | | | 1 | 0x4600 | 4 |
| | | | 2 | 0x5500 | 3 |
| | | | 3 | NULL | NULL |

COMPRESSED DATA MANAGEMENT INFORMATION 10

STORAGE DEVICE

CLAIM OF PRIORITY

The present application claims priority from Japanese patent application JP 2023-127066 filed on Aug. 3, 2023, the content of which is hereby incorporated by reference into this application.

BACKGROUND ART

This invention relates to a storage device that reduces the amount of stored data by compressing the data.

In recent years, technologies that produce a new value through analysis of a huge amount of data, as represented by the Internet of things (IoT) and artificial intelligence (AI), have been prevailing. Storage devices for storing such a huge amount of data are requested to exhibit low data storage cost (price per capacity) and high input/output (I/O) performance.

The data storage cost is calculated by multiplying a bit cost (price per capacity) and the amount of stored data. A technology to reduce the data storage cost by reducing the amount of stored data is compression. Compression reduces the amount of data by encoding a bit string of data into a shorter bit string.

US 2022/0121402 A discloses a storage system that employs a large size of compression unit and compresses data written by a host collectively to attain high data amount reduction effect.

SUMMARY

A typical lossless compression algorithm used for storage devices is a sliding dictionary method. This method provides a larger dictionary search space by employing a larger compression unit. Compression unit means data size of compression. A large dictionary search space provides a high probability to find identical data therefrom, achieving high data reduction effect. Taking an example of a data string ABABABCD, when the compression unit has a length corresponding to four characters, the data string is divided into two data strings of ABAB and ABCD and compressed. On this occasion, the data string ABAB can be coded as two repeats of dictionary data AB. However, the data string ABCD cannot be coded. In contrast, when the compression unit has a length corresponding to eight characters, the data string ABABABCD can be coded as three repeats of dictionary data AB and a data string CD.

US 2022/0121402 A discloses a method for a storage device to collectively compress data written by a host, in which a larger compression unit is employed to achieve high data reduction effect. However, the technique of US 2022/012402A does not refer to how to process the compressed data when the host updates only a part of the compressed data.

An aspect of this invention is a storage device having a function to compress data. The storage device includes: a processor; and an accelerator configured to compress and decompress data, wherein the processor receives first replacement write data for a part of a first logical address region to update first data in the first logical address region that has been compressed by basic compression unit, wherein the processor instructs the accelerator to compress the first replacement write data by a size smaller than the basic compression unit, wherein the accelerator compresses the first replacement write data by the smaller size, wherein the processor merges not-to-be-replaced data in the first logical address region and the first replacement data that are decompressed by the accelerator to generate uncompressed data having a size of the basic compression unit, and wherein the processor instructs the accelerator to compress the uncompressed data by the basic compression unit.

An aspect of this invention improves the I/O performance while reducing the data storage cost by increasing the data reduction rate.

DETAILED DESCRIPTION

Figure 1:
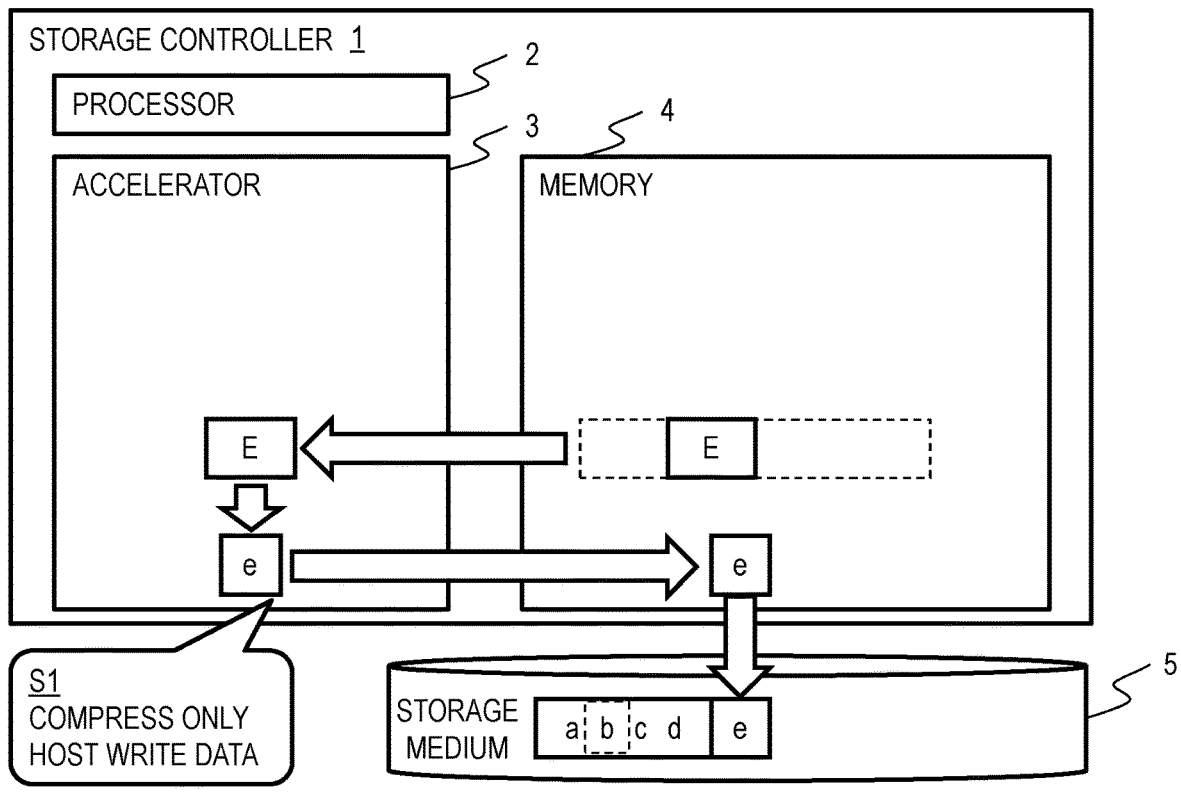
FIG. 1 is a diagram illustrating the concept of a compression process for host write data having a shorter length than one compression unit.

Hereinafter, embodiments of this invention are described with reference to the drawings. However, this invention is not to be interpreted as being limited to the configurations described in the embodiments. A person skilled in the art can easily understand that specific configurations in the embodiments can be altered without departing from the idea or the gist of this invention.

The expressions of "first", "second", "third", and the like in this specification are to identify the elements and are not necessarily to limit the number or the order. In the following description of the configuration of the invention, the same or similar components or functions are denoted by the identical reference signs and repetitive description thereof is skipped.

The following description may use the common parts in the reference signs (or identical reference signs) for the same kind of components when they do not need to be distinguished from one another and use different reference signs (or the IDs of the components) when they need to be distinguished from one another.

The "primary storage" in the following description can be one or more memory devices including a memory. For example, a primary storage can be at least a primary memory device (typically, a volatile memory device) out of the primary memory device and an auxiliary memory device (typically, a non-volatile memory device). A storage unit can include at least either a cache area (e.g., a cache memory or a partial area thereof) or a buffer area (e.g., a buffer memory or a partial area thereof).

The "LUN" in the following description means a logical storage device or volume and mapped to a partial storage area or the whole storage area of a pool. In other words, a LUN is a partial storage area or the whole storage area of a pool. A host performs input/output (I/O) requests for a LUN. The allocation of storage areas of the storage drives to a LUN is managed through a pool.

A computer program is executed by a processor (for example, a central processing unit (CPU)) included in a storage controller to perform predetermined processing using storage resources (e.g., a primary storage) and/or a communication interface device (e.g., an HCA) as appropriate and therefore, the agent of some processing can be the storage controller or the processor. The storage controller can include a hardware circuit for performing a part or all of its processing. The computer program can be installed from a program source, which can be a program distribution server or a computer-readable storage medium.

The "host" in the following description is a system for sending I/O requests to a storage device; it can include an interface device, a storage unit (e.g., a memory), and a processor connected with these. The host system can consist of one or more host computers. At least one host computer can be a physical computer and the host system can include a virtual host computer in addition to the physical host computer.

First, an example of the operation supposed to be compression processing of a storage device when a host writes data smaller than a compression unit defined by the storage device (hereinafter referred to as basic compression unit) is described. In order to maintain the high data reduction rate, the storage device attempts to compress the data using the basic compression unit, regardless of the size of the write data received from the host. This compression can be performed by the following procedure.

The storage device retrieves compressed data including write data from a storage medium of the storage device and decompresses the data. Subsequently, the storage device merges the received write data with the decompressed data to make the size of the write data equal to the size of the basic compression unit. Then, the storage device compresses the write data by the basic compression unit and writes the compressed data to the storage medium. As understood from the above, when the write data is smaller in size than the basic compression unit, the storage device complements the write data with data in compressed data so that the storage device can compress the write data by basic compression unit.

In this supposed operation, however, the storage device not only compresses the write data received from the host but also retrieves compressed data from a storage medium, decompress it, and merges the write data with the decompressed data. The increased processing of the storage device degrades the I/O performance.

Hereinafter, compression processing that can prevent this degradation in write performance is described with embodiments.

Embodiment 1

An embodiment is described in which the storage device compresses write data from the host by the size of the write data and stores it to the storage medium, if the write data is smaller in size than the basic compression unit. This embodiment includes a compression process, a garbage collection process, and a compressed data aggregation process. According to this embodiment, the garbage collection process and the compressed data aggregation process are executed asynchronously with host write and the write data is recompressed by basic compression unit. This configuration improves the I/O performance in host write of data smaller than the basic compression unit.

First, the outline of the compression process is described with FIG. 1. As premises for the state illustrated in FIG. 1, a host 7 has written data A, data B, data C, and data D and a storage device 6 has compressed these by basic compression unit into compressed data abcd and stored the compressed data abcd to a storage medium 5.

FIG. 1 illustrates the operation in a compression process S1 when the host 7 sends replacement write data E for the data B. Upon receipt of the replacement write data E from the host 7, the storage device 6 stores the write data E to a memory 4 in a storage controller 1 of the storage device 6.

The processor 2 of the storage controller 1 finds out that the size of the replacement write data E is smaller than one basic compression unit and instructs an accelerator 3 to compress the replacement write data by the size of the replacement write data E. The accelerator 3 retrieves the replacement write data E from the memory 4, compresses it, and stores the compressed data e to the memory 4. The processor 2 stores the compressed data e to the storage medium 5. On this occasion, the processor 2 records that the data B before being rewritten has become unnecessary data (referred to as garbage) in management information.

Figure 2:
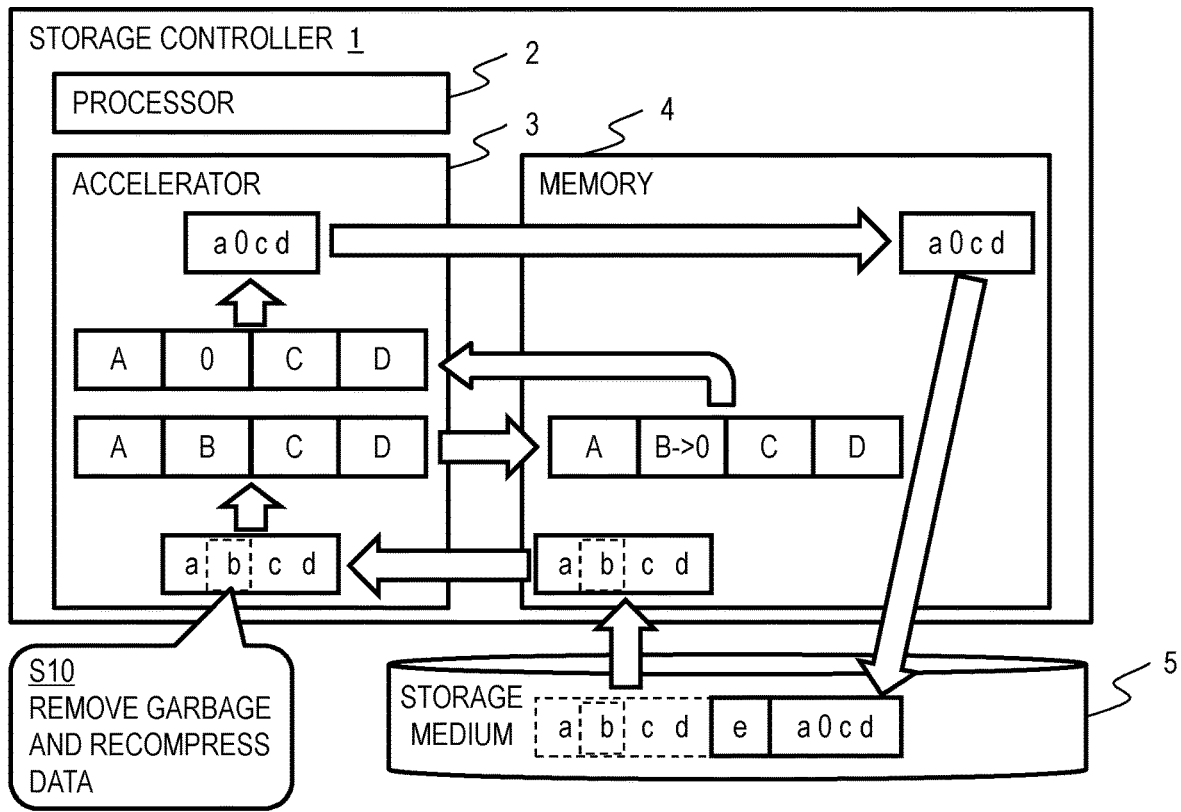
FIG. 2 is a diagram illustrating the concept of a garbage collection process for compressed data including garbage-state data.

Next, the outline of a garbage collection process S10 is described with FIG. 2. FIG. 2 illustrates that the storage device 6 deletes the garbage data B recorded in the compression process S1 in FIG. 1 to free an area of the storage medium 5. The processor 2 retrieves the compressed data abcd including the garbage data B from the storage medium 5 and stores it to the memory 4.

Successively, the processor 2 instructs the accelerator 3 to decompress the compressed data abcd. The accelerator 3 retrieves the compressed data abcd from the memory 4, decompresses it, and stores a data string ABCD to the memory 4. The processor 2 writes zero data to the location of the garbage data B to update the data string into a data string A0CD consisting of not-to-be-replaced data A, C, and D and zero data 0.

The processor 2 instructs the accelerator 3 to compress the data string A0CD. The accelerator 3 retrieves the data string A0CD from the memory 4, compresses it, and stores the compressed data a0cd to the memory 4. Subsequently, the processor 2 stores the compressed data a0cd to the storage medium 5 and deletes the compressed data abcd in the storage medium 5. The garbage B is deleted through the foregoing operation.

Figure 3:
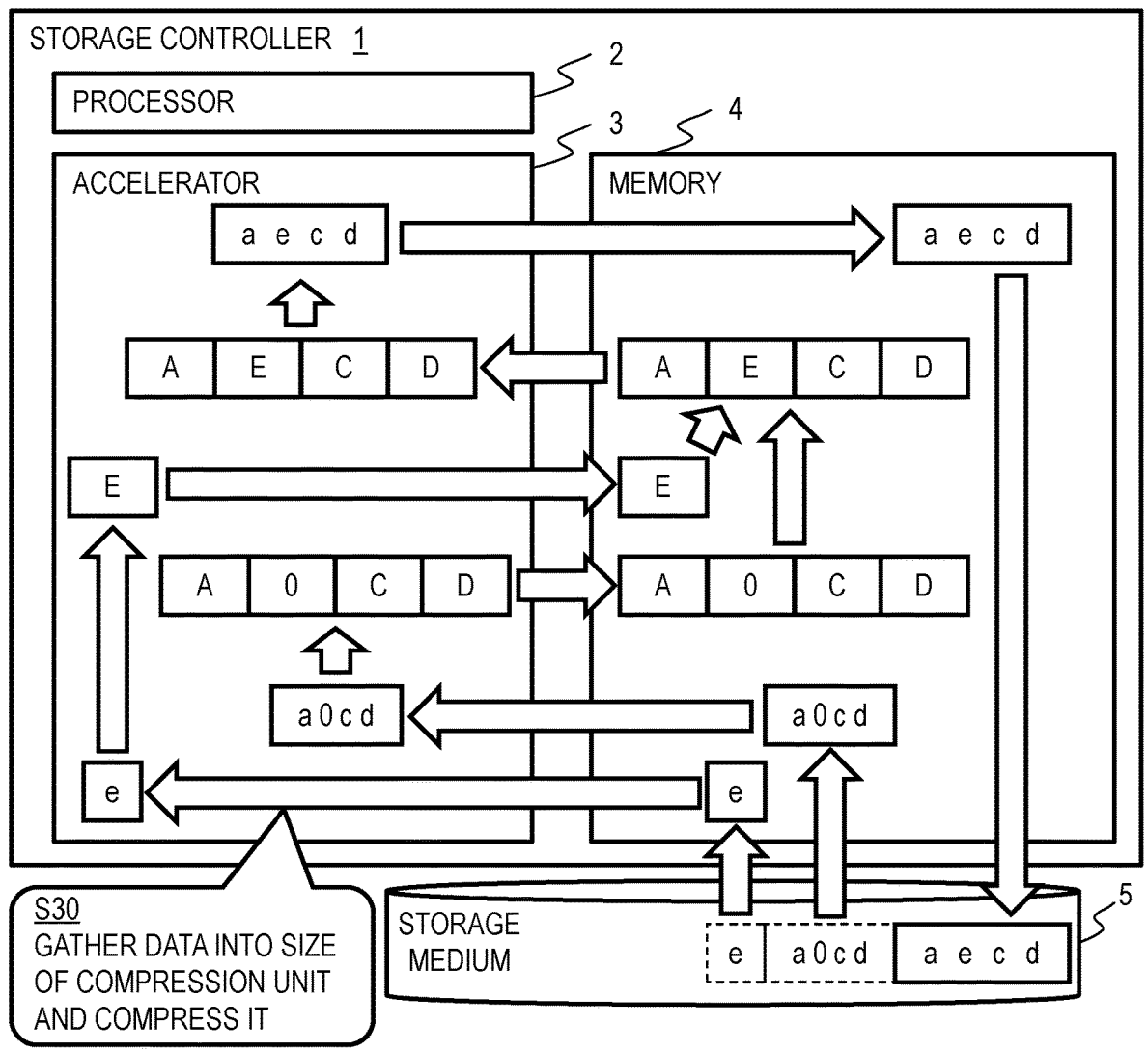
FIG. 3 is a diagram illustrating the concept of a compressed data aggregation process.

Lastly, the outline of a compressed data aggregation process S30 is described with FIG. 3. FIG. 3 illustrates that the storage device 6 gathers compressed data e and compressed data a0cd and replaces them with data aecd compressed by basic compression unit to maintain the high data reduction effect.

The processor 2 retrieves compressed data e that is not compressed by basic compression unit and compressed data a0cd from the storage medium 5 and stores them to the memory 4. The processor 2 instructs the accelerator 3 to decompress the compressed data e and the compressed data a0cd. The accelerator 3 separately retrieves and decompresses the compressed data e and the compressed data a0cd and stores data E and a data string A0CD to the memory 4. The instruction from the processor 2 to the accelerator 3 to decompress compressed data can be separated into two instructions.

The processor 2 merges the data E and the data string A0CD into a data string AECD and instructs the accelerator 3 to compress it. The accelerator 3 retrieves the data string AECD, compresses it, and stores the compressed data aecd to the memory 4. The processor 2 stores the compressed data aecd to the storage medium 5 and deletes the compressed data e and the compressed data a0cd in the storage medium 5.

The foregoing is the outlines of the compression process S1, the garbage collection process S10, and the compressed data aggregation process S30. In place of the accelerator 3, the processor 2 can perform compression and decompression. Hereinafter, the storage device 6 in Embodiment 1 is described in detail.

Figures 4, 5:
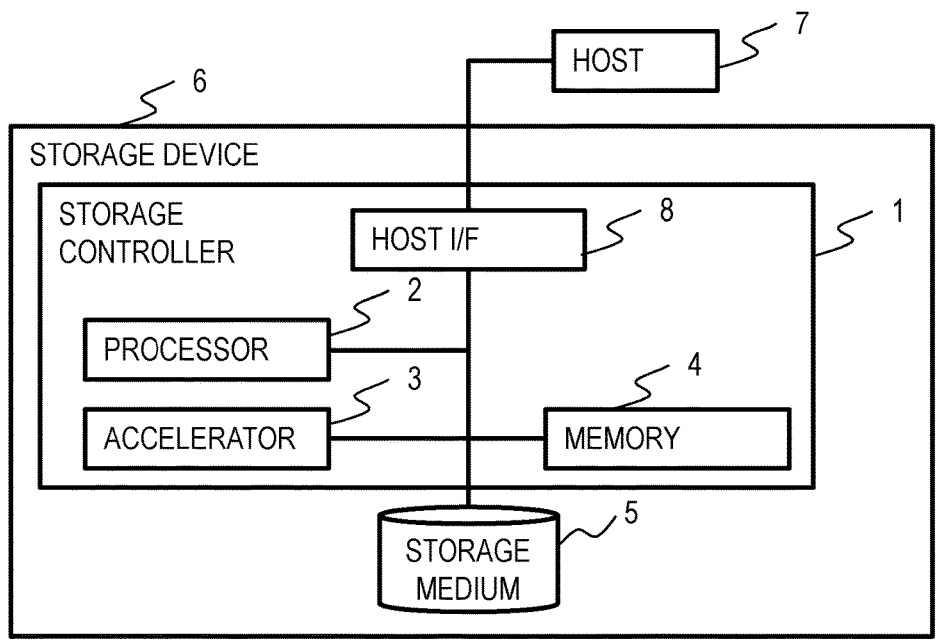
FIG. 4 is a diagram illustrating a configuration of a storage device.
FIG. 5 is a diagram illustrating a configuration of compressed data management information.

FIG. 4 is a diagram illustrating an example of the configuration of the storage device 6 in Embodiment 1.

The storage device 6 is connected to the host 7 where to provide its storage area via networks such as a storage area network (SAN) and a local area network (LAN). Examples of the host 7 are a personal computer and a smartphone.

The storage device 6 includes a storage controller 1 and a storage medium 5. The storage controller 1 performs processing in accordance with commands. The storage controller 1 includes a processor 2, an accelerator 3, a memory 4, and a host interface (I/F) 8. These hardware components are interconnected with one another via an internal network.

The host I/F 8 is an interface for connecting to the host 7. The host I/F 8 performs processing to send and receive commands and data between the storage device 6 and the host 7. The processor 2 executes programs stored in the memory 4. The processor 2 in Embodiment 1 works as a computing unit or a control unit for performing a variety of processing in accordance with commands.

The accelerator 3 performs compression and decompression in accordance with instructions from the processor 2. The accelerator 3 is hardware designed to perform high-speed compression and decompression; it can be implemented by a field programmable gate array (FPGA), for example.

The memory 4 is a memory device such as a dynamic random-access memory (DRAM) and stores programs to be executed by the processor 2 and information to be used by the programs. The memory 4 is also used as a work area of the programs. The memory 4 can be either a volatile memory or a non-volatile memory.

The memory 4 in this embodiment stores compressed data management information 10. The memory 4 also stores programs (not shown) for implementing a computing unit or a control unit. The details of the compressed data management information 10 will be described later with FIG. 5.

The storage medium 5 is a non-volatile memory device. The storage medium 5 can be a semiconductor memory device such as a solid-state drive (SSD) or a hard disk drive. The storage medium 5 is connected to the storage controller 1 via an internal network to communicate commands with the processor 2 and communicate data with the memory 4. Although the storage medium 5 is directly connected to the storage controller 1 via the internal network, the storage medium 5 can be connected to the storage controller 1 via an interface for the storage medium connected with the internal network.

FIG. 5 is a diagram providing an example of compressed data management information 10 in Embodiment 1. The compressed data management information 10 is information for managing compressed data. The compressed data management information 10 stores entries each consisting of a logical address 11, a physical address 12, a compressed data size 13, logical address offsets 14, offset-based physical addresses 15, and offset-based compressed data sizes 16. One entry includes a plurality of logical address offsets 14, offset-based physical addresses 15, and offset-based compressed data sizes 16. One entry corresponds to a data string compressed by basic compression unit.

The logical address 11 is a field for storing a logical address indicating the storage location of the data string in the volume provided to the host 7. Compression units are managed by logical address. For example, when the size of a compression unit is 32 KB, 32 KB of data at consecutive logical addresses is collectively compressed. The combination of logical addresses constituting each compression unit is constant. The logical address 11 indicates the start address of the compression unit. The physical address 12 is a field for storing an address in the storage medium 5 indicating the storage location of the compressed data in the storage device 6. The compressed data here is data the accelerator 3 has generated by compressing a data string.

The compressed data size 13 is a field for storing the data size of the compressed data. The data size of compressed data depends on the size of the original data string and the values to be stored. Accordingly, the data sizes of the compressed data are usually different. To increase the data reduction effect, compressed data should be stored to the storage medium 5 without a gap. For this reason, the processor 2 controls the disposition of compressed data in the storage medium 5 using the compressed data management information 10.

Each logical address offset 14 is a field for storing the logical address of a host write data unit in the compression unit before being compressed. A host write data unit is the smallest unit in host write and has a size of 8 KB, for example. The data length specified in one write command is an integral multiple of this data unit. In the following description, the write data size means the size of this host write data unit. A logical address offset 14 is the locational information indicating the difference from 0, letting 0 be the start logical address of the write data to be compressed by basic compression unit. The logical address offset 14 can store the logical address of the host write data unit, instead of the difference.

Each offset-based physical address 15 is a field for storing the address in the storage medium 5 of data compressed by host write data size, instead of basic compression unit. Each offset-based data size 16 is a field for storing the size of data compressed by host write data size.

The values to be stored in the physical address 12 and the offset-based physical addresses 15 can be the addresses provided by the storage medium 5 to the storage controller 1, the addresses in a volume of redundant arrays of inexpensive disks (RAID) configured of a plurality of storage media 5, or the addresses of an external storage device 6 provided by a capacity virtualization system.

Although the compressed data management information 10 is expressed in a table format as one configuration, the configuration of the information is not limited to a table format as far as the information necessary for the processing of the embodiments herein can be managed.

Figure 6:
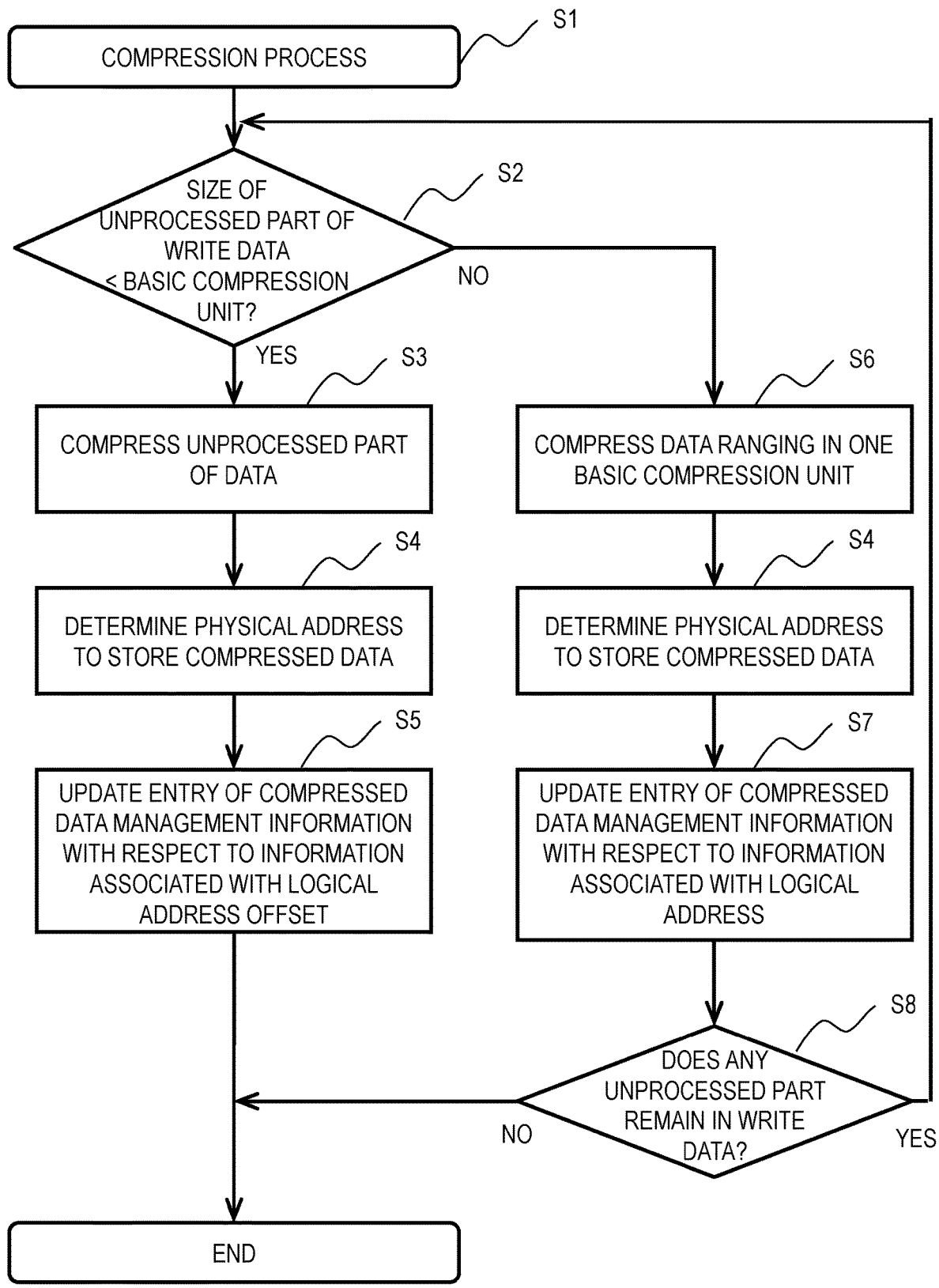
FIG. 6 is a flowchart of a compression process.

FIG. 6 is a flowchart of an example of the compression process to be executed by the processor 2 in Embodiment 1.

The processor 2 executes the compression process S1 in executing a write process or periodically. The write process is executed when the storage device 6 receives write data from the host 7. This section describes the compression process S1, assuming that the process S1 is executed with the write process. In the write process, the storage device 6 stores write data to the memory 4 and sends a notice of completion of the write process to the host 7.

The processor 2 determines whether the unprocessed part of the write data stored in the memory 4 is smaller in size than one basic compression unit (Step S2).

If the unprocessed part of the write data is smaller than one basic compression unit, the processor 2 instructs the accelerator 3 to compress the write data by the write data size (Step S3).

After the accelerator 3 compresses the unprocessed part of the write data and stores the compressed data to the memory 4, the processor 2 locates the end (the address thereof) of the compressed data already stored in the storage medium 5 with reference to the compressed data management information 10, particularly the fields of physical addresses 12, compressed data sizes 13, offset-based physical addresses 15, and offset-based data sizes 16, and determines the physical address to store the compressed data in the memory 4 (Step S4). The write data is thus added to the free area of the storage medium 5.

The processor 2 updates the entry of the compressed data management information 10 with respect to the relevant logical address offset. Specifically, the processor 2 searches the compressed data management information 10 for the relevant logical address offset 14 based on the logical address of the write data and stores the physical address determined at Step S4 and the size of the compressed data in the memory 4 to the offset-based physical address 15 and the offset-based data size 16 associated with the logical address offset 14 (Step S5).

If the determination at Step S2 is that the unprocessed part of the write data is not smaller than one basic compression unit, the processor 2 instructs the accelerator 3 to compress the write data by basic compression unit (Step S6).

The accelerator 3 retrieves data in the logical address range corresponding to one basic compression unit from the memory 4, compresses it, and stores the compressed data to the memory 4. The processor 2 performs the processing described at Step S4 for the compressed data stored in the memory 4 to determine the physical address to store the data.

The processor 2 updates the entry of the compressed data management information 10 with respect to the relevant logical address. Specifically, the processor 2 searches the compressed data management information 10 for the logical address 11 including the logical address of the write data and stores the physical address determined at Step S4 to the physical address 12 associated with the logical address 11 and the size of the compressed data in the memory 4 to the compressed data size 13 (Step S7). The processor 2 further stores a value "NULL" as an invalid value to the plurality of offset-based physical addresses 15 and offset-based compressed data sizes 16 associated with the logical address 11. The value "NULL" is referred to as an example of an invalid value; other values can be used as far as it can be distinguished from valid values.

Subsequently, the processor 2 determines whether any unprocessed part remains in the write data (Step S8). If an unprocessed part remains in the write data, the processor 2 executes Step S2. If no unprocessed part remains, the processor 2 exits the compression process S1.

The foregoing is the description of Step S1.

In the case of periodically executing the compression process S1, the processor 2 executes the process described with FIG. 6 on data of each write stored in the memory 4.

After executing the compression process S1, the processor 2 stores the compressed data to the determined address of the storage medium 5 at an appropriate time. The compression process S1 and storing the compressed data can be executed successively or storing the compressed data can be executed periodically. In the case of storing compressed data periodically, the processor 2 searches the memory 4 for compressed data and stores the detected compressed data to the storage medium 5.

Figure 7:
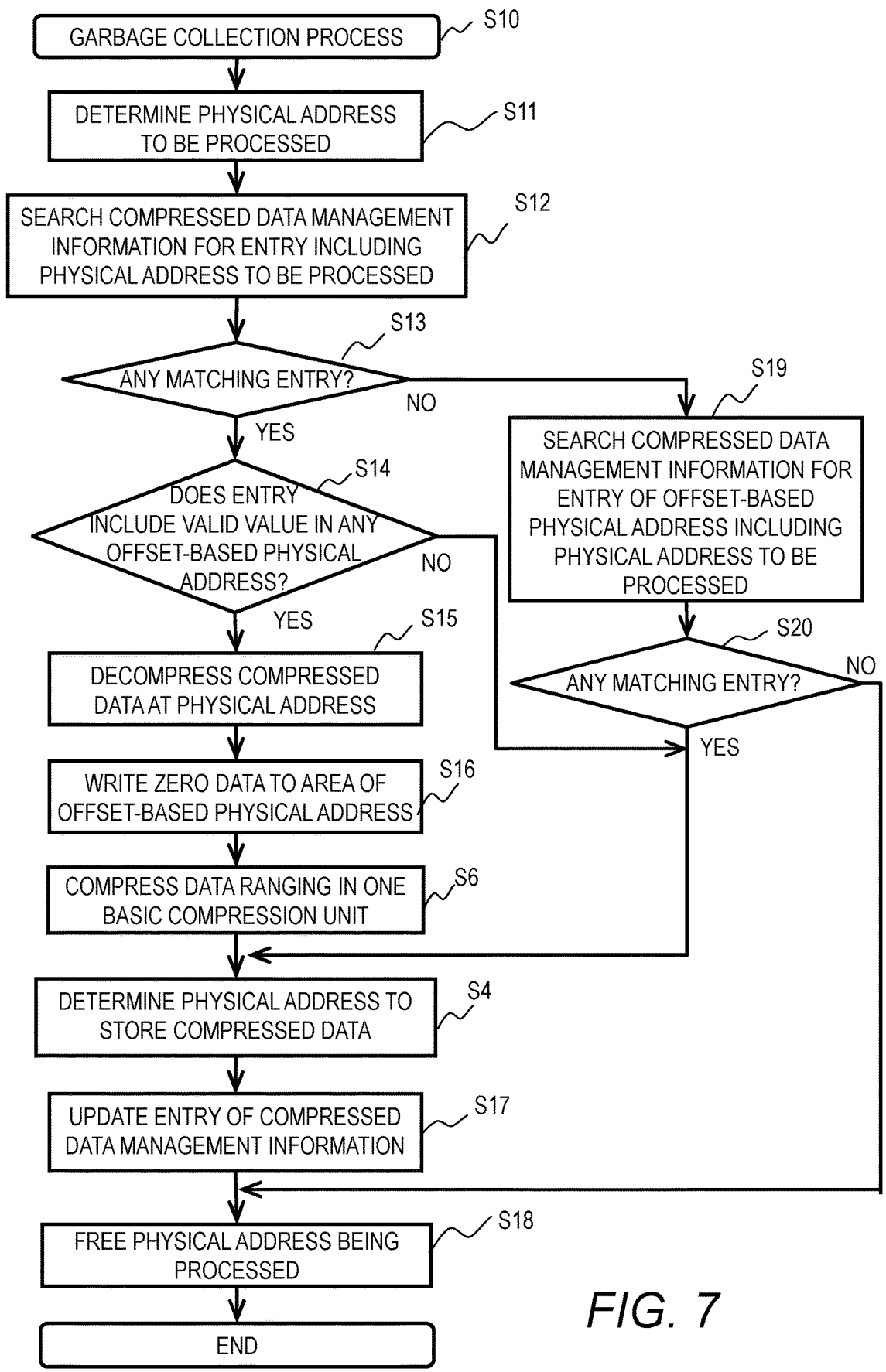
FIG. 7 is a flowchart of a garbage collection process.

FIG. 7 is a flowchart of an example of the garbage collection process to be executed by the processor 2 in Embodiment 1. The garbage collection process deletes compressed data in the storage medium 5 that is no longer referred to because of data update to make its storage area into an unused area. The garbage collection process S10 can be invoked periodically or when some compressed data has become garbage because the processor 2 has received write data from the host 7.

The processor 2 selects a physical address subjected to garbage collection (Step S11). The physical addresses applicable for garbage collection are managed in not-shown management information. Selecting a physical address including a larger amount of garbage reduces transfer of compressed data, which will be described later, enabling more physical addresses to be freed. For this reason, the processor 2 selects a physical address including a larger amount of garbage. Such selection can be made by the processor 2 acquiring information on the size of compressed data to become garbage in updating compressed data management information 10 in the compression process S1, recording the amount of garbage at each physical address, and searching for a physical address including a larger amount of garbage.

The processor 2 searches the compressed data management information 10 for an entry including the physical address selected at Step S11 in the physical address 12 (Step S12). The processor 2 determines whether a matching entry is found (Step S13). If a matching entry is found, the processor 2 determines whether any of the offset-based physical addresses 15 of the entry stores a valid value (Step S14). If none of the offset-based physical addresses 15 store a valid value, meaning that the processor 2 has not compressed write data having a size smaller than one basic compression unit and the compressed data at the logical address of this entry is only data compressed by basic compression unit, the processor 2 executes Step S4, as will be described later.

Contrarily, if at least one of the offset-based physical addresses 15 stores a valid value, the processor 2 retrieves the compressed data at the physical address 12 of the entry from the storage medium 5, stores it to the memory 4, and instructs the accelerator 3 to decompress it (Step S15).

After the accelerator 3 stores the decompressed data to the memory 4, the processor 2 rewrites the decompressed data in the memory 4 in the part corresponding to the data stored in the offset detected at Step S14 with zero data (Step S16). This processing increases the data compression rate in compression by basic compression unit and further, eliminates the necessity of data shift in data read. The zero data is data having a high compression rate. The decompressed data can be rewritten with predetermined data (bit string) different from zero data. For the predetermined data, well-regulated data having a high compression rate can be defined in advance. For example, it can be a bit string of all 1's.

The processor 2 instructs the accelerator 3 to compress the data rewritten at Step S16 by basic compression unit (Step S6). The accelerator 3 retrieves the designated data from the memory 4, compresses it, and stores the compressed data to the memory 4.

The processor 2 executes Step S4 described with reference to FIG. 6 to determine the physical address to store the compressed data. The processor 2 updates the entry of the compressed data management information 10 by storing the physical address determined at Step S4 to the physical address 12 and the size of the compressed data in the memory 4 to the compressed data size 13 (Step S17).

The processor 2 frees the physical address determined at Step S11 to enable other process to use the physical address (Step S18).

If no entry is found at Step S13, the processor 2 searches the compressed data management information 10 for an entry including the physical address selected at Step S11 in an offset-based physical address 15 (Step S19).

The processor 2 determines whether a matching entry is found (Step S20). If a matching entry is found, meaning that the data is compressed by host write data size, the processor 2 executes Step S4. If a matching entry is not found, meaning that the data being processed has already been rewritten and become garbage, the processor 2 executes Step S18. The foregoing is the description of Step S10.

Figure 8:
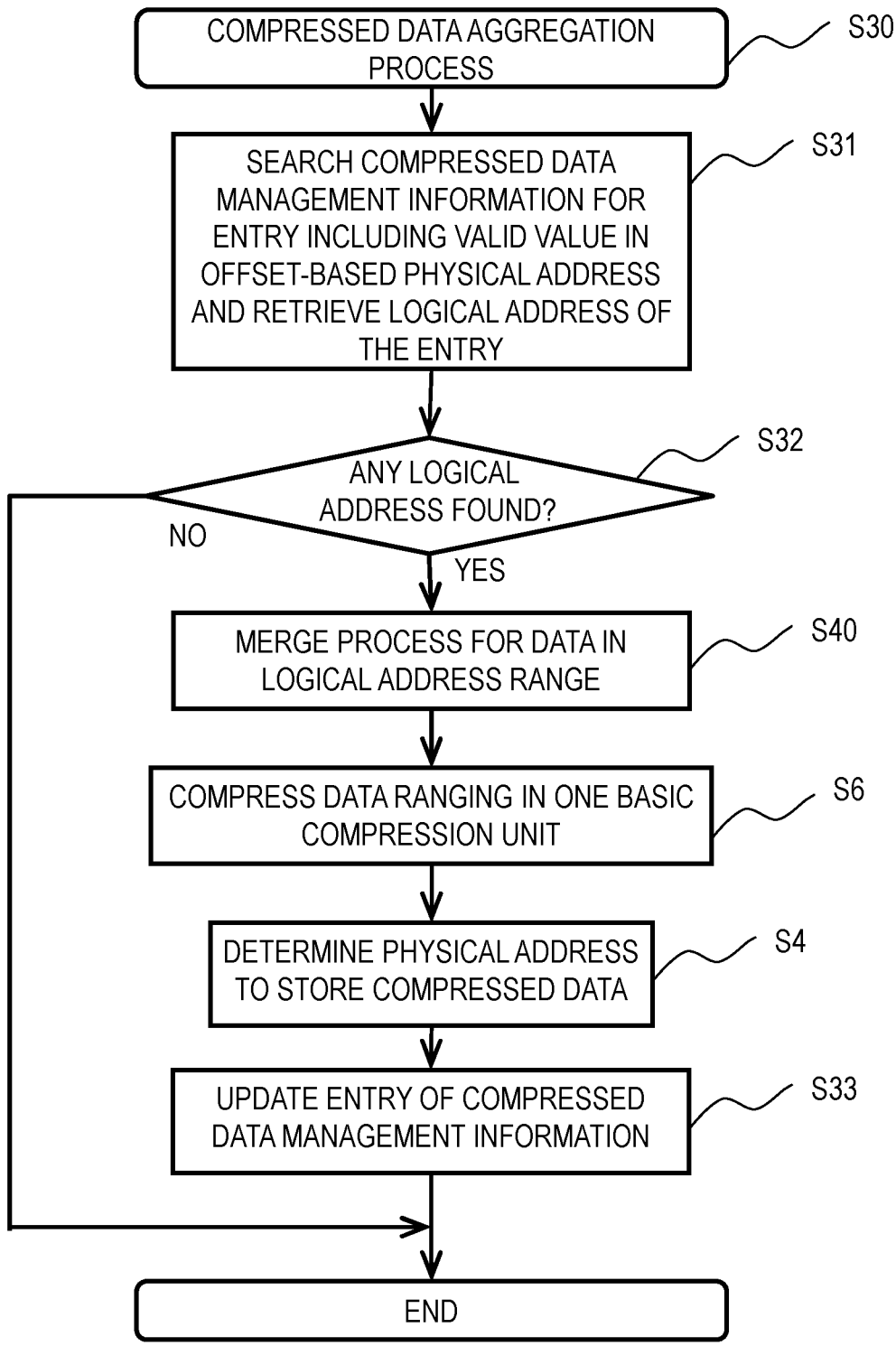
FIG. 8 is a flowchart of a compressed data aggregation process.

FIG. 8 is a flowchart of an example of the compressed data aggregation process to be executed by the processor 2 in Embodiment 1. The processor 2 periodically executes this compressed data aggregation process S30.

The processor 2 searches the compressed data management information 10 for an entry including a valid value in any of the offset-based physical addresses 15 to retrieve the logical address 11 from the detected entry (Step S31). The processor 2 determines whether such a logical address 11 is found through the search (Step S32).

If such a logical address 11 is not found, the processor 2 exits the compressed data aggregation process S30. Contrarily, if such a logical address 11 is found, the processor 2 executes a merge process on the compressed data in the range corresponding to the logical address 11 (Step S40). In this merge process, the processor 2 instructs the accelerator 3 to decompress the data compressed by basic compression unit and the data compressed by the host write data size, merges the decompressed data, and stores the merged data to the memory 4. The details of this merge process will be described later with reference to FIG. 9.

The processor 2 executes Step S6 described with reference to FIG. 6 on the data merged at Step S40 to make the accelerator 3 store compressed data to the memory 4.

The processor 2 executes Step S4 described with reference to FIG. 6 and determines the physical address to store the compressed data.

The processor 2 stores the physical address determined at Step S4 to the physical address 12 of the entry found at Step S31 and the size of the compressed data stored to the memory 4 at Step S6 to the compressed data size 13. Furthermore, the processor 2 stores invalid values to the offset-based physical addresses 15 and offset-based compressed data sizes 16 of the entry (Step S33). The foregoing is the description of Step S30.

Figure 9:
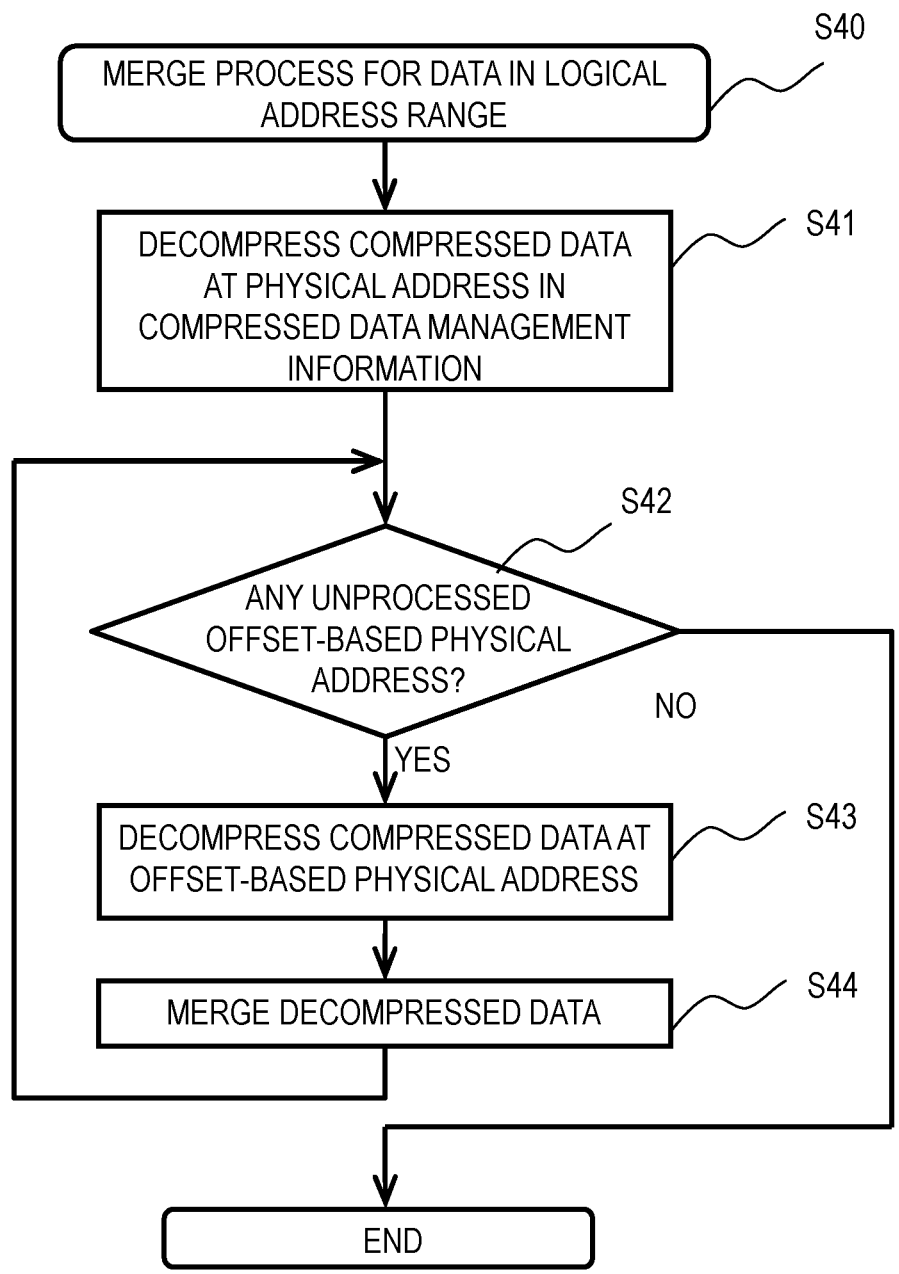
FIG. 9 is a flowchart of a merge process for data in a logical address range.

FIG. 9 is a flowchart of an example of the merge process S40 for the data in a logical address range, which is to be executed by the processor 2 in Embodiment 1.

The processor 2 retrieves compressed data located at the physical address 12 of the detected entry in the compressed data management information 10 from the storage medium 5, stores it to the memory 4, and instructs the accelerator 3 to decompress it (Step S41).

The accelerator 3 retrieves the compressed data in the memory 4, decompresses it, and stores the decompressed data to the memory 4.

The processor 2 determines whether the entry of the compressed data management information 10 includes any unprocessed offset-based physical address 15 including a valid value (Step S42). If there is no unprocessed offset-based physical address 15 including a valid value, the processor 2 exits the merge process for the data in a logical address range.

Contrarily, if detecting an unprocessed offset-based physical address 15 including a valid value, the processor 2 retrieves the compressed data at the offset-based physical address 15 from the storage medium 5, stores it to the memory 4, and instructs the accelerator 3 to decompress it (Step S43). The accelerator 3 retrieves the compressed data from the memory 4, decompresses it, and stores the decompressed data to the memory 4.

The processor 2 calculates the locational information where to place data to be merged in the decompressed data in the memory 4 stored at Step S41 with reference to the logical address offset 14 and copies the decompressed data in the memory 4 stored in accordance with the instruction at Step S43 to the calculated location (Step S44) to merge data with the other data.

Subsequently, the processor 2 executes Step S42 again. The foregoing is the description of Step S40.

Described above is a method for a storage device 6 to compress write data received from the host 7 by write data size. The storage device 6 can raise the I/O performance in host write by recompressing the data by basic compression unit asynchronously with host write.

The above-described example selects one of two sizes of compression units, namely the basic compression unit and the data write unit smaller than the basic compression unit, to compress replacement data received from a host. Another example can select one of three or more sizes of compression units. For example, another compression unit of a size between the basic compression unit and the data write unit is prepared. The basic compression unit can be 32 KB, the data write unit can be 8 KB, and the medium compression unit can be 16 KB. The compression unit of 16 KB can be used to compress 16 KB of data and the compression unit of 16 KB and the compression unit of 8 KB can be used to compress 24 KB of data.

Embodiment 2

Another embodiment is described in which the garbage collection process is configured to remove garbage in compressed data and realign the non-garbage data to close the space before recompressing it.

According to this embodiment, joining non-garbage data produces a repeat of data, which raises the I/O performance when the remaining capacity of the storage medium 5 is small.

The storage device 6 in Embodiment 2 has the same configuration as that of Embodiment 1 illustrated in FIG. 6. The compression process and the compressed data aggregation process executed by the storage device 6 in Embodiment 2 are the same as the compression process S1 and the compressed data aggregation process S30 in Embodiment 1.

Figure 10:
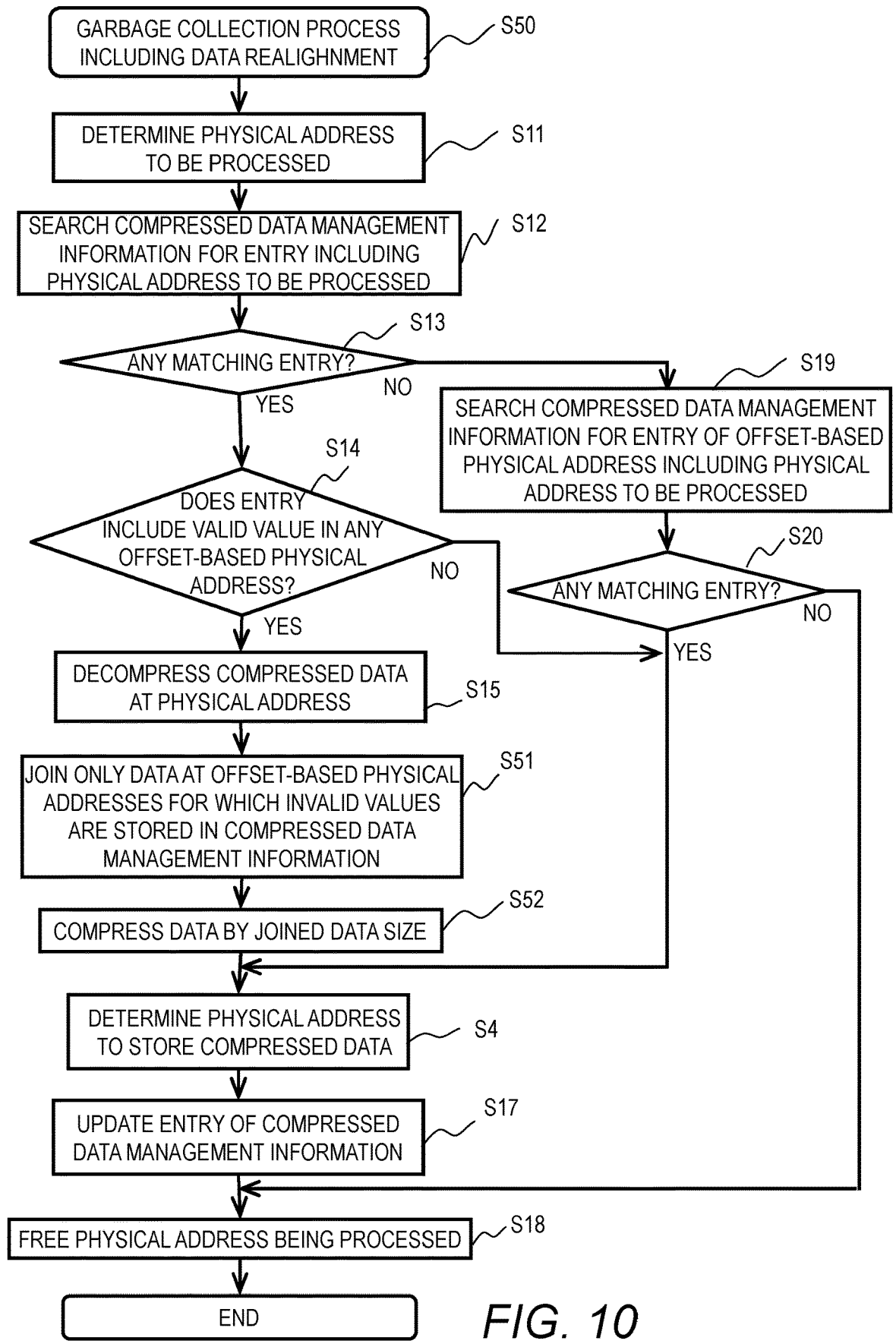
FIG. 10 is a flowchart of a garbage collection process including data realignment before recompression.

FIG. 10 is a flowchart of an example of the garbage collection process including data realignment, which is to be executed by the processor 2 in Embodiment 2. This section omits detailed description of the process steps same as those shown in FIG. 7 in Embodiment 1.

The trigger to invoke the garbage collection process S50 including data realignment is the same as that of the garbage collection process S10 in Embodiment 1. Specifically, the process S50 can be invoked periodically or when some compressed data has become garbage because the processor 2 has received write data from the host 7.

The processor 2 executes Steps S11, S12, S13, S14, and S15 described in Embodiment 1.

Subsequent to Step S15, the processor 2 creates a data string by joining only the decompressed data corresponding to the data at the offset-based physical addresses 15 including an invalid value in the entry of the compressed data management information 10 and stores it to the memory 4 (Step S51).

The processor 2 instructs the accelerator 3 to compress the created data string by the size of the data string joined at Step S51 (Step S52). The accelerator 3 has a function to compress data by a size between the basic compression unit and the write data size, in addition to the sizes of the basic compression unit and the write data size. For example, the accelerator 3 has functions to compress data by not only 32 KB of the basic compression unit and 8 KB of the smallest unit of write data but also 16 KB and 24 KB.

Subsequent to Step S52, the processor 2 executes Steps S4, S17, and S18 described in Embodiment 1.

If no entry is found at Step S13, the processor 2 executes Steps S19 and S20 described in Embodiment 1.

The foregoing is the description of Step S50.

In the garbage collection process executed by the storage device 6, recompressing only non-garbage data joined together may generate a repeat laying across the joined data and increase the compression rate. Then, the physical addresses newly secured by the garbage collection are made fewer, raising the I/O performance when the remaining capacity of the storage medium 5 is small. In compressing the replacement data from the host, the compression unit to be used can be selected from not only the basic compression unit and the write data size unit but also the medium-sized units. If the replacement data has a data length shorter than the basic compression unit, the replacement data can be compressed by its data length. In addition to replacement data of 32 KB of the basic compression unit or 8 KB of the write data unit, replacement data of 24 KB or 16 KB can be compressed together.

Embodiment 3

Another embodiment is described in which the garbage collection process is configured to overwrite the garbage in compressed data with host write data before recompressing it.

According to this embodiment, the garbage collection process includes compressed data aggregation process S30 to reduce generation of garbage, which raises the I/O performance when the remaining capacity of the storage medium 5 is small.

The storage device 6 in Embodiment 3 has the same configuration as that of Embodiment 1 illustrated FIG. 6. The compression process and the compressed data aggregation process executed by the storage device 6 in Embodiment 3 are the same as the compression process S1 and the compressed data aggregation process S30 in Embodiment 1.

Figure 11:
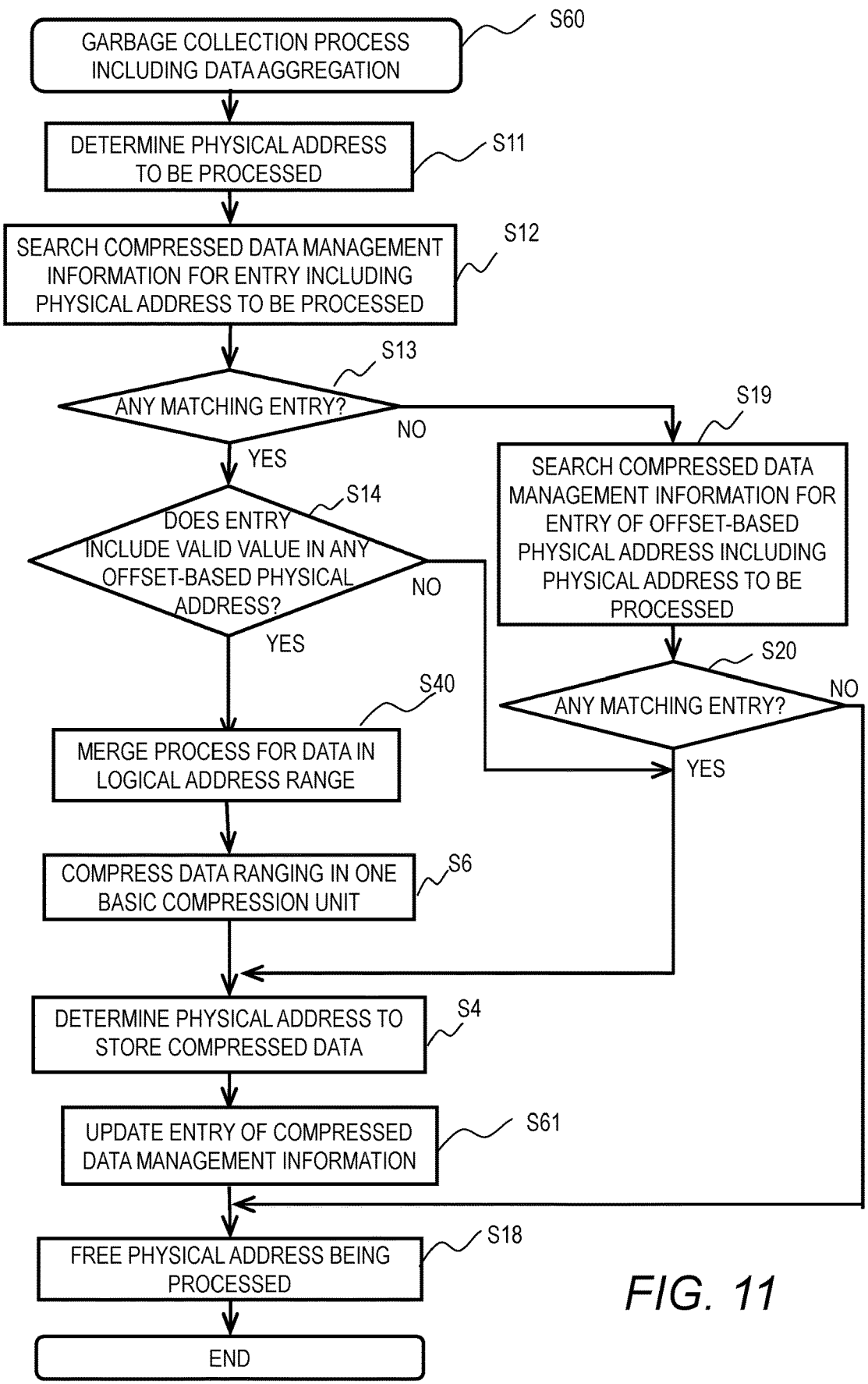
FIG. 11 is a flowchart of a garbage collection process including aggregation of compressed data.

FIG. 11 is a flowchart of an example of the garbage collection process including data aggregation, which is to be executed by the processor 2 in Embodiment 3. This section omits detailed description of the process steps same as those shown in FIG. 7 in Embodiment 1.

The garbage collection process S60 including data aggregation is executed periodically. This is because, if this Step S60 is invoked when the storage device 6 receives write data from the host 7, the processing of data aggregation included therein interferes with the effect of raising the I/O performance in host write.

The processor 2 executes Steps S11, S12, S13, and S14 described in Embodiment 1.

If the determination at Step S14 is that a valid value is stored in any of the offset-based physical addresses 15, the processor 2 executes Step S40 on the entry detected at Step S12. Through this step, the data obtained by decompressing the compressed data at the physical address 12 of the entry and the data obtained by decompressing the compressed data at the offset-based physical address 15 are merged and stored to the memory 4.

Successively, the processor 2 executes Steps S6 and S4 described with reference to FIG. 6.

Subsequently, the processor 2 updates the entry of the compression data management information 10 by storing the physical address determined at Step S4 to the physical address 12 and the size of the compressed data generated at Step S6 to the compressed data size 13. Furthermore, the processor 2 stores invalid values to the offset-based physical addresses 15 and the offset-based compressed data sizes 16 of the entry (Step S61).

Thereafter, the processor 2 executes Step S18 described with reference to FIG. 7.

If no entry is found at Step S13, the processor 2 executes Steps S19 and S20 described in Embodiment 1.

The foregoing is the description of Step S60.

Including aggregating compressed data in the garbage collection process to be executed by the storage device 6 reduces generation of garbage, which raises the I/O performance when the remaining capacity of the storage medium 5 is small.

Embodiment 4

Still another embodiment is described in which the compression process uses different compression units depending on the condition of use of the storage medium 5.

In the compression process S1 and the compressed data aggregation process S30 in Embodiment 1, a part or all of compressed data becomes garbage when new compressed data is generated. The amount of garbage generated in Embodiment 1 is larger than the one generated by the aforementioned example of operation supposed for a compression process. If the remaining capacity of the storage medium 5 is smaller than the amount of garbage generated by the compression process S1 and the compressed data aggregation process S30 in Embodiment 1, the storage medium 5 may run short of capacity.

According to this embodiment, when the remaining capacity of the storage medium 5 is smaller than a threshold, data compression is performed only by the basic compression unit, which has an effect of suppressing the reduction of the remaining capacity of the storage medium 5 caused by host write.

The storage device 6 in Embodiment 4 has the same configuration as that of Embodiment 1 illustrated FIG. 6. The garbage collection process and the compressed data aggregation process executed by the storage device 6 in Embodiment 4 are the same as the garbage collection process S10 and the compressed data aggregation process S30 in Embodiment 1.

Figure 12:
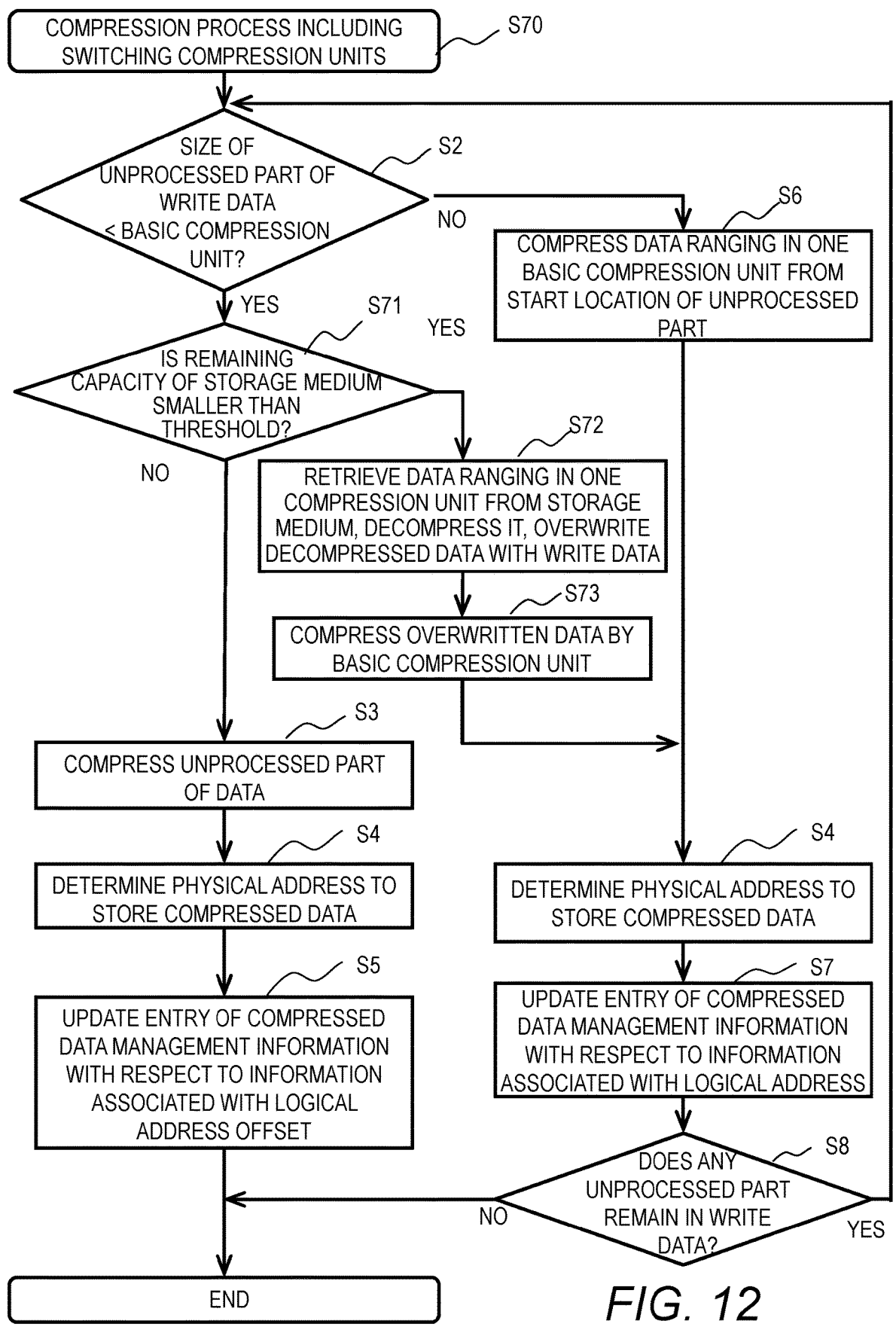
FIG. 12 is a flowchart of a compression process including switching compression units.

FIG. 12 is a flowchart of an example of the compression process including switching compression units, which is to be executed by the processor 2 in Embodiment 4. This section omits detailed description of the process steps same as those shown in FIG. 6 in Embodiment 1.

The trigger to invoke the compression process S70 including switching compression units is the same as that of the compression process S1 in Embodiment 1. Specifically, the processor 2 executes this process S70 in executing a write process or periodically.

The processor 2 executes Step S2 described in Embodiment 1.

If the unprocessed part of the write data is smaller than one basic compression unit, the processor 2 determines whether the remaining capacity of the storage medium 5 is smaller than a threshold (Step S71). The threshold can be a fixed value predetermined by the product design or a value specified by the user of the storage device 6 during the use of the storage device 6. The processing of Step S71 can be determining whether the rate of freeing physical addresses in the storage medium 5 in the garbage collection process S10 is lower than the rate of writing by the host 7, meaning whether the storage medium 5 will not be able to accept write data from the host 7 in future because of shortage in capacity. Regarding this determination, the remaining capacity of the storage medium 5 can be determined to be smaller than the threshold when the transition of the amount of garbage in the LUN indicates that the amount of garbage is increasing, for example.

If the determination at Step S71 is that the remaining capacity of the storage medium 5 is smaller than the threshold, the processor 2 retrieves the compressed data including the original write data from the storage medium 5, stores it to the memory 4, and instructs the accelerator 3 to decompress it. The accelerator 3 retrieves the compressed data from the memory 4, decompresses it, and stores the decompressed data to the memory 4. The processor 2 overwrites the decompressed data in the memory 4 with the replacement write data to merge the decompressed data and the replacement write data (Step S72).

The processor 2 instructs the accelerator 3 to compress the data generated at Step S72 by basic compression unit (Step S73).

The accelerator 3 retrieves the data from the memory 4, compresses it, and stores the compressed data to the memory 4.

Subsequently, the processor 2 executes Steps S4, S7, and S8 described in Embodiment 1.

If the determination at Step S71 is not that the remaining capacity of the storage medium 5 is smaller than the threshold, the processor 2 executes Steps S3, S4, and S5 described in Embodiment 1.

If the determination at Step S2 is not that the unprocessed part of the write data is smaller than one basic compression unit, the processor 2 executes Steps S6, S4, S7, and S8 described in Embodiment 1.

The foregoing is the description of Step S70.

In the compression process to be executed by the storage device 6, when the remaining capacity of the storage medium 5 is as small as the storage medium 5 cannot store the garbage generated in the compression process S1 and the compressed data aggregation process S30 in Embodiment 1, compressing data only by basic compression unit as described above can suppress reduction of the remaining capacity of the storage medium 5 because of host write.

It should be noted that this invention is not limited to the above-described embodiments but include various modifications. For example, the above-described embodiments provide details for the sake of better understanding of this invention; they are not limited to those including all the configurations as described. A part of the configuration of an embodiment may be replaced with a configuration of another embodiment or a configuration of an embodiment may be incorporated into a configuration of another embodiment. A part of the configuration of an embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions can be stored in a memory device such as a memory, a hard disk drive, or an SSD, or a storage medium such as an IC card or an SD card.

The drawings show control lines and information lines as considered necessary for explanations but do not show all control lines or information lines in the products. It can be considered that most of all components are actually interconnected.

What is claimed is:

1. A storage device having a function to compress data, the storage device comprising:
    a processor; and
    an accelerator configured to compress and decompress data,
    wherein the processor receives first replacement write data for a part of a first logical address region to update first data in the first logical address region that has been compressed by basic compression unit,
    wherein the processor instructs the accelerator to compress the first replacement write data by a size smaller than the basic compression unit,
    wherein the accelerator compresses the first replacement write data by the smaller size,
    wherein the processor merges not-to-be-replaced data in the first logical address region and the first replacement data that are decompressed by the accelerator to generate uncompressed data having a size of the basic compression unit, and
    wherein the processor instructs the accelerator to compress the uncompressed data by the basic compression unit.

2. The storage device according to claim 1,
    wherein the processor executes a garbage collection process configured to delete compressed data that is no longer referred to because of data update to make an unused storage area,
    wherein the processor executes the garbage collection process before the merging, and
    wherein the garbage collection process is configured to:
        instruct the accelerator to decompress the compressed first data;
        rewrite data in the part of the first logical address region in the decompressed first data with a predetermined bit string; and
        instruct the accelerator to compress the rewritten first data by the basic compression unit.

3. The storage device according to claim 1,
    wherein the processor executes a garbage collection process configured to delete compressed data that is no longer referred to because of data update to make an unused storage area,
    wherein the processor executes the garbage collection process before the merging, and wherein the garbage collection process is configured to:
   instruct the accelerator to decompress the compressed first data;
   join the not-to-be-replaced data in the decompressed first data; and
   instruct the accelerator to compress the joined not-to-be-replaced data by the size of the joined not-to-be-replaced data.

4. The storage device according to claim 1,
wherein the processor executes a garbage collection process configured to delete compressed data that is no longer referred to because of data update to make an unused storage area,
wherein the processor executes the merging in the garbage collection process, and
wherein the garbage collection process is configured to:
   instruct the accelerator to decompress the compressed first data and the compressed first replacement write data;
   rewrite data in the part of the first logical address region in the decompressed first data with the first replacement write data; and
   instruct the accelerator to compress the rewritten first data by the basic compression unit.

5. The storage device according to claim 1, further comprising:
a storage medium,
wherein the processor instructs the accelerator to compress the first replacement write data by a size smaller than the basic compression unit in a case where the storage medium has a remaining capacity larger than a threshold, and
wherein the processor instructs the accelerator to decompress the compressed first data, updates the decompressed first data with the first replacement write data, and instructs the accelerator to recompress the updated first data by the basic compression unit in a case where the storage medium has a remaining capacity smaller than the threshold.

6. A data processing method for storing compressed data to a storage medium, the data processing method comprising:
   receiving first replacement write data for a part of a first logical address region to update first data in the first logical address region that has been compressed by basic compression unit;
   compressing the first replacement write data by a size smaller than the basic compression unit;
   decompressing compressed not-to-be-replaced data in the first logical address region and the compressed first replacement write data and merging decompressed data to generate uncompressed data having a size of the basic compression unit; and
   compressing the uncompressed data by the basic compression unit.

7. The data processing method according to claim 6, further comprising:
   executing a garbage collection process configured to delete compressed data that is no longer referred to because of data update to make an unused storage area before the merging,
wherein the garbage collection process includes:
   decompressing the compressed first data;
   rewriting data in the part of the first logical address region in the decompressed first data with a predetermined bit string; and
   compressing the rewritten first data by the basic compression unit.

8. The data processing method according to claim 6, further comprising:
   executing a garbage collection process configured to delete compressed data that is no longer referred to because of data update to make an unused storage area before the merging,
wherein the garbage collection process includes:
   decompressing the compressed first data;
   joining the not-to-be-replaced data in the decompressed first data; and
   compressing the joined not-to-be-replaced data by the size of the joined not-to-be-replaced data.

9. The data processing method according to claim 6, further comprising:
   executing a garbage collection process configured to delete compressed data that is no longer referred to because of data update to make an unused storage area,
wherein the garbage collection process includes:
   the merging;
   decompressing the compressed first data and the compressed first replacement write data;
   rewriting data in the part of the first logical address region in the decompressed first data with the first replacement write data; and
   compressing the rewritten first data by the basic compression unit.

10. The data processing method according to claim 6, further comprising:
   compressing the first replacement write data by a size smaller than the basic compression unit in a case where the storage medium has a remaining capacity larger than a threshold; and
   decompressing the compressed first data, updating the decompressed first data with the first replacement write data, and compressing the updated first data by the basic compression unit in a case where the storage medium has a remaining capacity smaller than the threshold.

* * * * *